US008800025B2

United States Patent
Fung et al.

(10) Patent No.: US 8,800,025 B2
(45) Date of Patent: Aug. 5, 2014

(54) INTEGRATED VIRTUAL DESKTOP AND SECURITY MANAGEMENT SYSTEM

(76) Inventors: Hei Tao Fung, Newark, CA (US); Hsingyi Lee, San Jose, CA (US)

(*) Notice: Subject to any disclaimer, the term of this patent is extended or adjusted under 35 U.S.C. 154(b) by 752 days.

(21) Appl. No.: 12/615,266

(22) Filed: Nov. 10, 2009

(65) Prior Publication Data

US 2011/0113472 A1    May 12, 2011

(51) Int. Cl.
*G06F 9/00* (2006.01)
*H04L 29/06* (2006.01)

(52) U.S. Cl.
CPC .......... *H04L 63/0227* (2013.01); *H04L 63/102* (2013.01)
USPC ............ 726/15; 726/1; 726/2; 726/3; 726/13; 726/14; 726/22; 726/23; 726/24; 718/1; 709/203; 709/217; 709/224; 709/225; 709/226; 709/229

(58) Field of Classification Search
CPC . H04L 63/0272; H04L 12/4641; H04L 63/08; H04L 63/20; H04L 63/164
USPC ............................................................ 726/3
See application file for complete search history.

(56) References Cited

U.S. PATENT DOCUMENTS

| | | | |
|---|---|---|---|
| 2005/0270980 A1* | 12/2005 | McGee ................ | 370/238 |
| 2008/0005441 A1* | 1/2008 | Droux et al. .......... | 710/306 |
| 2008/0028071 A1* | 1/2008 | Miyajima .............. | 709/224 |
| 2008/0123676 A1* | 5/2008 | Cummings et al. ..... | 370/419 |
| 2008/0148341 A1* | 6/2008 | Ferguson et al. ....... | 726/1 |
| 2008/0295172 A1* | 11/2008 | Bohacek ................ | 726/23 |
| 2009/0043840 A1* | 2/2009 | Cherukuri et al. ...... | 709/203 |
| 2009/0254990 A1* | 10/2009 | McGee ................. | 726/22 |
| 2010/0138924 A1* | 6/2010 | Heim et al. ........... | 726/24 |
| 2011/0050712 A1* | 3/2011 | Jackson ................ | 345/503 |

OTHER PUBLICATIONS

N. Sertac Artan et al., "Boundary Hash for Memory-Efficient Deep Packet Inspection," IEEE coomunication Society, ICC 2008 proceddings, pp. 1732-1737.*
Chih-Hung et al., A Low-Cost Green IT Concept Design of VHSP based on Virtualization Technology, 2009 IEEE International Conference on Systems, Man, and Cybernetics, Oct. 2009, pp. 4858-4863.*

* cited by examiner

*Primary Examiner* — Luu Pham
*Assistant Examiner* — Canh Le (57) ABSTRACT

An integrated virtual desktop and security management system provides the virtual desktop server functionality and, more importantly, security management for computing devices and servers in the corporate data network. The computing devices include computers running virtual desktop client software and computers running a complete operating system and applications. The system in this invention can intercept data packets exchanged among the computing devices and servers and also can scrutinize virtual machine computing and networking activities, and therefore, possess the capability of analyzing, logging, reporting, and permitting or denying computing and networking activities of devices in the corporate data network.

7 Claims, 5 Drawing Sheets

INTEGRATED VIRTUAL DESKTOP AND SECURITY MANAGEMENT SYSTEM

FIELD OF THE INVENTION

The present invention relates to computer networking in general. In particular, the disclosure is directed to computing and networking security management in Local Area Network (LAN) where computers running virtual desktop client software, computers running a complete Operating System (OS) and applications, servers, data storage devices, and other networking and computing devices are attached.

BACKGROUND OF THE INVENTION

A Local Area Network (LAN) is a computer network covering a small physical area, like a home, office, or small group of buildings. It is common nowadays that its backbone is a cluster of switches, where routers, computers, servers, data storage elements, and various types of computing and networking devices are connected.

Network security comprises the provisions made in the underlying LAN, management policies to protect the network and the network-accessible resources from unauthorized access, and continuous evaluation of its effectiveness. Traditionally, much attention has been dedicated to protecting the LAN from external intruders. Recently the focus has been shifted to intra-LAN security: protecting resources from attack or simple mistakes by people inside the organization.

Regular computers nowadays usually comprise high performance CPUs, sizeable hard disks, and a complete operating system (OS), loaded with an array of application software. However, there begins the emergence of 'thin-client' computers, driven by cost reduction in computer ownership and the virtualization technological advancement. Thin-client computers behave more like computer terminals whose functions are primarily for entering and displaying data. Thin-client computers have low system requirements: a low performance CPU, a small storage, a boot loader, and a virtual desktop client software application. They rely on the virtual desktop client to communicate to its virtual desktop server on its LAN. Once they run the virtual desktop client, they receive user inputs and display the computing results, and the computing is actually performed on the virtual desktop server via virtual machine (VM). A VM is a software implementation of a computer that executes programs like a real machine.

The presence of thin-client computers represents the change of data traffic pattern in the LAN. The confluence of the traffic is the virtual desktop server(s). The thin-client computers send user inputs to the virtual desktop server and the virtual desktop server sends back the desktop display outputs. The virtual desktop server exchanges data packets with various computing and networking resources on the LAN as the VMs are running on the virtual desktop server. That hub-and-spoke data traffic pattern makes the virtual desktop server an excellent choice for applying intra-LAN security management policy.

Furthermore, the presence of thin-client computers presents a new capability and hence, an array of opportunities, in network security management. The virtual desktop server has privilege access to the VMs running on it. In other words, it has visibility into all computing activities of the VMs representing the thin-client computers. Therefore, the network administrators can possess superior power in monitoring and controlling computing activities given the appropriate tools on the virtual desktop server.

That said, the transition from a LAN full of regular computers to a LAN full of thin-client computers may be gradual. Having a mixture of the two classes of computers on the LAN is expected.

Against that backdrop, the invention disclosed is to exploit the intra-LAN security potential in the virtual desktop client and server LAN environment while addressing the possible presence of regular computers.

BRIEF SUMMARY OF THE INVENTION

The present invention discloses an integrated virtual desktop and security management system (VDSMS) and methods to provide intra-LAN security management and virtual desktop service for computers connected to the LAN.

VDSMS primarily functions as a virtual desktop server and also a security management server. It comprises the capabilities of intercepting LAN traffic, forwarding intercepted packets to the intended devices on the LAN and the intended VMs, DHCP relay, and deep packet inspection (DPI).

VDSMS is a high-performance special-purpose computer with a complete and specialized OS and specialized applications. Much like the state-of-art servers, it comprises one or more general or specialized processors, memory, persistent storage, network interface, I/O interface, peripheral bus such as PCI, and peripherals.

In one embodiment of the invention, VDSMS is deployed as a stand-alone network element attached to the LAN switch, co-existing with the router and data storage server.

In another embodiment of the invention, VDSMS, attached to the LAN switch, is integrated with the data storage server or the router, or both.

In another embodiment of the invention, VDSMS is integrated with the LAN switch, taking the place of the LAN switch, having all other network elements attached to itself.

In another embodiment of the invention, VDSMS is actually a group of interconnected VDSMS performing the same functionality for scalability reason.

The aforementioned embodiments and other embodiments as well as objects and advantages of the present invention will become apparent from the following detailed description of various embodiments of the present invention read in conjunction with the accompanying drawings. The detailed description and drawings of the various embodiments of the present invention are merely illustrative of the present invention rather than limiting, the scope of the present invention being defined by the appended claims and equivalents thereof.

BRIEF DESCRIPTION OF THE DRAWINGS/FIGURES

The present disclosure will be understood more fully from the detailed description that follows and from the accompanying drawings, which however, should not be taken to limit the disclosed subject matter to the specific embodiments shown, but are for explanation and understanding only.

DETAILED DESCRIPTION OF THE INVENTION

The present invention discloses an integrated virtual desktop and security management system (VDSMS) and methods to provide intra-LAN security management and virtual desktop service for thin-client computers connected to the LAN.

Figure 1:
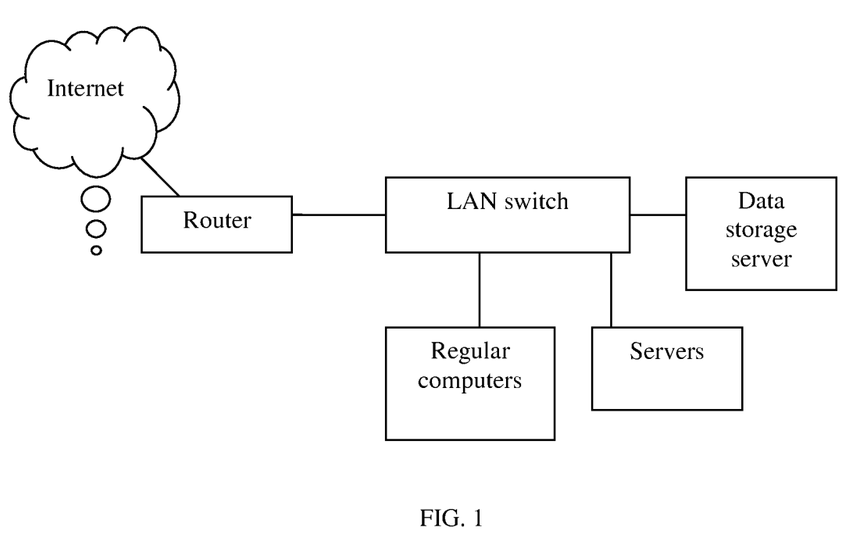
FIG. 1 is a diagram of a typical small office network architecture.
Figure 2:
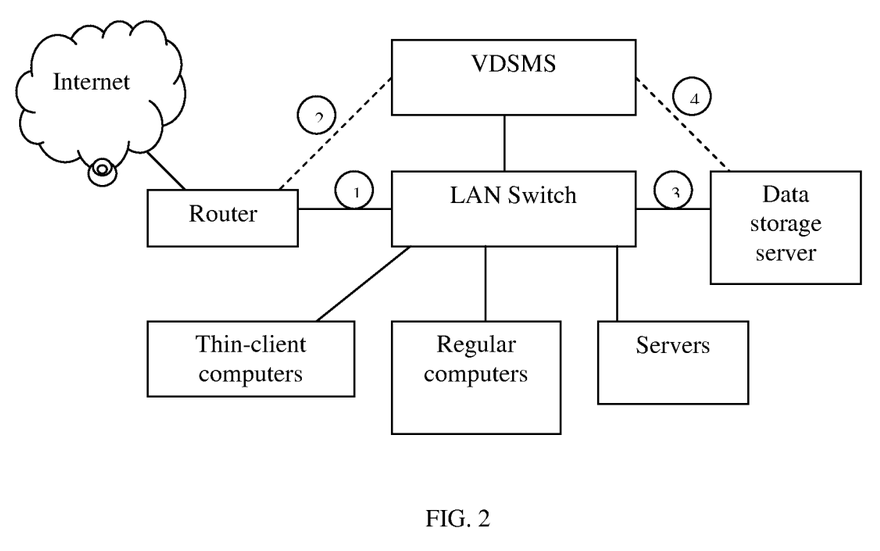
FIG. 2 illustrates one embodiment of the invention fitting in a small office network.

FIG. 1 shows an example of network architecture where the present invention can be practiced. In one embodiment of the invention, the VDSMS is attached to the LAN switch where the router, the data storage server, and other network devices are also attached. Refer to FIG. 2. VDSMS primarily functions as a virtual desktop server and a security management server. It comprises the capabilities of intercepting LAN traffic, forwarding intercepted packets to the intended devices on the LAN and the intended VMs, DHCP relay, and deep packet inspection (DPI).

VDSMS enforces the security management policies that are configured by administrators. The detailed description of the security management policies is beyond the scope of this disclosure due to its variety. However, some examples can be offered. VDSMS may report all email activities on the LAN: the senders, the receivers, the subjects, etc. VDSMS may report all Internet access activities: the requesters, the URLs, etc. VDSMS may provide capability to block emails and Internet access matching some specified criteria. VDSMS may provide file access logging. VDSMS may provide capability to block external transfer of files matching some specified criteria. VDSMS may provide capability of displaying the desktop of any VM running for real-time monitoring purpose by the administrator.

VDSMS can implement the security management policies due to its access to all VMs' computing and networking activities as it is the virtual desktop server that hosts the VMs. Moreover, for regular computers, VDSMS uses one or more of the following methods to intercept network traffic so that VDSMS maintains access and control over the networking activities of the regular computers.

Figure 3:
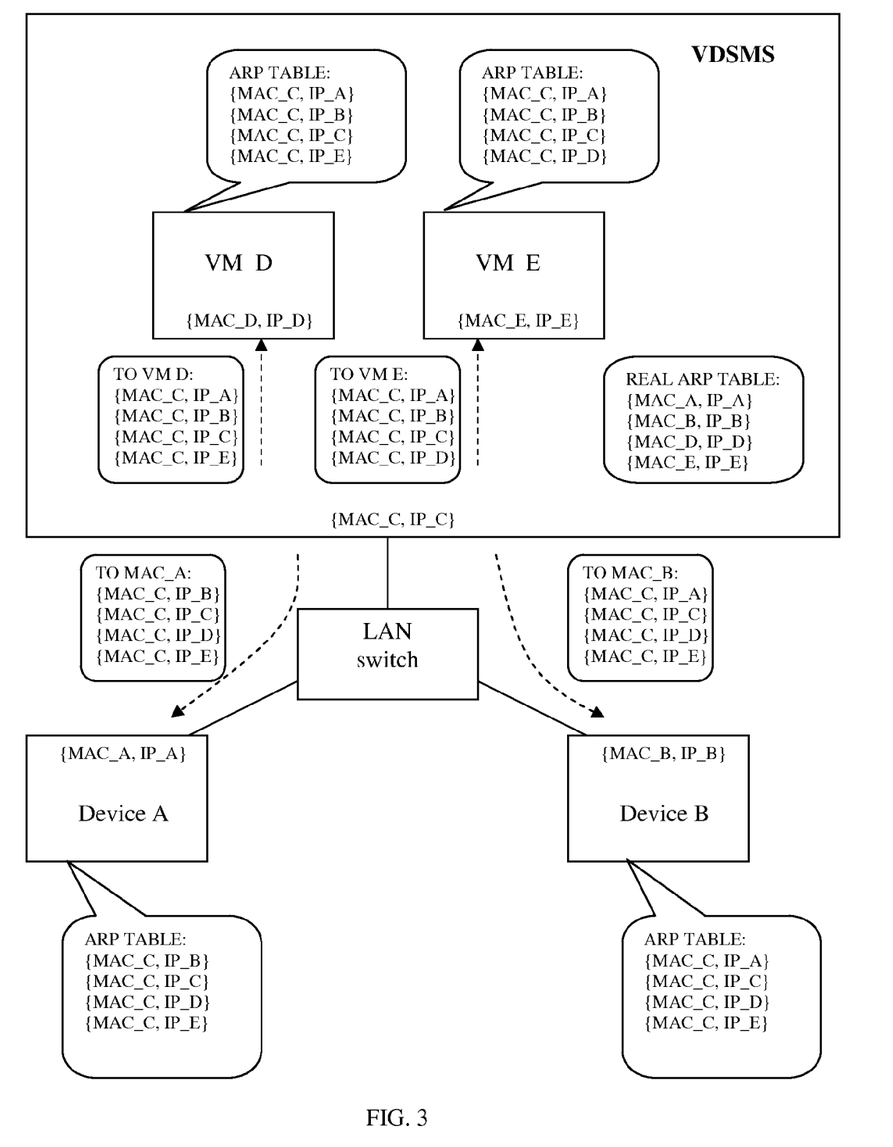
FIG. 3 is a system diagram of one embodiment of the invention where VDSMS intercepting network traffic through gratuitous ARP.

In the first method, VDSMS learns the MAC addresses of all devices in the LAN when the devices send broadcast Ethernet frames. On the one hand, VDSMS sends out gratuitous ARP packets to all devices so that the ARP table of each device has all entries pointing to the VDSMS MAC address. Gratuitous ARP is an ARP request or ARP reply that is not normally needed according to the ARP specification RFC 826 but could be used in some cases. A gratuitous ARP request is an ARP request packet where the source and destination IP are both set to the IP of the machine issuing the packet and the destination MAC is the broadcast address ff-ff-ff-ff-ff-ff. Ordinarily, no reply packet will occur. A gratuitous ARP reply is a reply to which no request has been made. On the other hand, VDSMS keeps track of the real ARP table, the real mappings between the MAC addresses and the corresponding IP addresses of all devices so that VDSMS can do packet forwarding properly. Refer to FIG. 3. In this method, the broadcast traffic from any device can still reach all other devices without the intervention of VDSMS. VDSMS, however, intercepts all unicast traffic. VDSMS has to act as a DHCP relay agent if there are unicast DHCP messages.

In the second method, VDSMS sets up, via SNMP or other protocols, the L2 switching table on the Ethernet switch to direct ff-ff-ff-ff-ff-ff broadcast traffic to VDSMS. As a result, VDSMS receives all ARP requests alone and sends ARP responses with its own MAC address. When VDSMS sends a broadcast frame to the LAN, it uses a generic multicast frame setting the UG bit to 1. Also, VDSMS intercepts all DHCP messages, so it has to act as a DHCP relay agent.

In the third method, VDSMS sets up, via SNMP or other protocols, a unique VLAN on each Ethernet switch port and sets up the Ethernet switch port connecting to the VDSMS as a trunk port having access to all VLANs. When VDSMS needs to send a broadcast frame to the LAN, it replicates the frame on all VLANS to reach all Ethernet switch ports. VDSMS also acts as a DHCP relay agent.

In the fourth method, if the Ethernet switch provides the capability of special L2 forwarding rule that can be based on the ingress port, VDSMS can use that capability and direct the traffic received on ports that are not connected to VDSMS to the port that is connected to VDSMS. VDSMS also acts as a DHCP relay agent.

In the fifth method, VDSMS assigns, via SNMP or other protocols, all computers to a VLAN and all servers and the router to another VLAN, and sets up the Ethernet switch port connecting to the VDSMS as a trunk port having access to both VLANs and all other Ethernet switch ports as access ports. That configuration forbids regular computers doing many networking activities without going through the VDSMS. VDSMS also acts as a DHCP relay agent.

It is apparent that all aforementioned methods employed in VDSMS allow VDSMS to be inserted into an existing LAN and to function without manual configuration changes on the devices on the existing LAN. Among the aforementioned methods, the first method is our preferred embodiment because its interaction with the Ethernet switch is minimal.

VDSMS intercepts network traffic via the aforementioned methods. Then VDSMS can apply deep packet inspection (DPI) looking beyond the headers of the packets for packet classification and security policy enforcement.

VDSMS intercepts network traffic via the aforementioned methods, and consequently it has to perform packet forwarding and also DHCP relay functions to allow devices on the LAN communicating through it.

VDSMS performs the following packet forwarding functions: VDSMS keeps track of the real ARP table, the real mappings between the MAC addresses and their corresponding IP addresses of the devices. When VDSMS receives a packet whose destination MAC address is the MAC address of VDSMS and whose destination IP address is not an IP address of its VMs, VDSMS forwards the packet to the intended device on the LAN, according to said real ARP table, replacing the destination MAC address. When VDSMS receives a packet whose destination IP address is one of the IP addresses of the VMs, VDSMS forward is the packet to the corresponding VM. When VDSMS receives a broadcast packet or a packet whose destination MAC address is not the MAC address of VDSMS, VDSMS forwards the packet to the VMs.

VDSMS performs the DHCP relay function. Normally in a typical network architecture as depicted in FIG. 1, the router is also the DHCP server. As other devices sending DHCP requests may not be able to reach the router, VDSMS is to perform the DHCP relay function. VDSMS obtains its IP address from the DHCP server on boot-up. Through that procedure, VDSMS finds out the IP address of the DHCP server automatically. From then on, VDSMS can relay any DHCP message between the DHCP server and the devices on the LAN.

Figure 4:
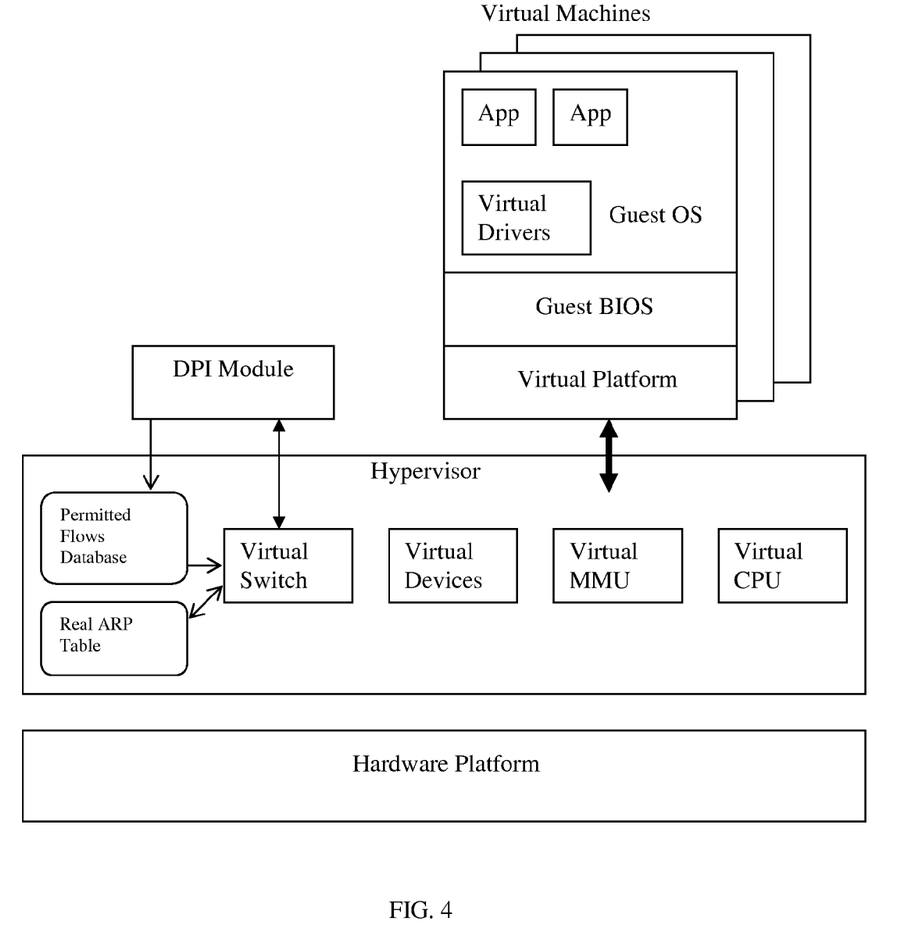
FIG. 4 is the system architecture of one embodiment of VDSMS.

VDSMS is a high-performance special-purpose computer with a complete and specialized OS and specialized applications. Much like the state-of-art computers, it comprises one or more general or specialized processors, memory, persistent storage, network interface, I/O interface, and peripheral interface such as PCI. FIG. 4 is a diagram showing the architecture of one preferred embodiment. A plurality of VMs are running at the user-level. The hypervisor is a virtualization software that allows multiple guest operating systems to run on VDSMS concurrently. The hypervisor runs directly on the host's hardware as a hardware control and guest operating system monitor. The hypervisor comprises a virtual switch. All packets traversing between the physical network interfaces of the VDSMS and the VMs' logical network interfaces must be processed by said virtual switch. Said virtual switch performs the aforementioned packet forwarding functions. Said virtual switch populates and uses the aforementioned real ARP table. Also, said virtual switch uses a Permitted Flows Database. The Permitted Flows Database contains entries of five-tuple classification rules that uniquely identify packet flows. A five-tuple classification rule contains the destination IP address, the source IP address, the protocol number, the destination port number, and the source port number. If a packet does not match any of the flows in the database, then said virtual switch forwards the packet to the DPI module. The DPI module resides outside the hypervisor and on one of the processors on VDSMS. The DPI module enforces security policies on the packet. If the DPI module determines that subsequent packets of the packet flow, identified by the five-tuple classification rule, require no further deep packet inspection, the DPI module installs a flow entry into the Permitted Flows Database.

In the first embodiment of the invention, the VDSMS is attached to the LAN switch where the router, the data storage server, and other network devices are also attached. Using the example in FIG. 2, the embodiment corresponds to using connections 1 and 3 and not using connection 2 and 4. However, for performance, scalability, or cost-reduction, there are various embodiments that involve different degree of integration.

In another embodiment of the invention, VDSMS comprises a plurality of network interfaces. One network interface connects VDSMS to the LAN switch, and another connects VDSMS to the router. Said embodiment of the invention completely separates the router from other devices on the LAN physically. That assures that the VDSMS has complete authority in implementing its Internet access security policy. Using the example in FIG. 2, the embodiment corresponds to using connection 2 and not using connection 1.

In yet another embodiment of the invention, the VDSMS is integrated with the router. There are a couple of advantages. VDSMS can now comprise the firewall function that is normally implemented in the router. VDSMS becomes the central point of administering network security policies. Also, the overall DHCP handling is simplified.

In yet another embodiment of the invention, the VDSMS is integrated with the LAN switch where the switch chip is attached to the PCI bus. The VDSMS processors have direct control over the switch chip. The VDSMS processors can run all L2 protocols such as LACP and RSTP. The advantage is overall reduction in number of hardware components.

In yet another embodiment of the invention, the VDSMS is integrated with the LAN switch where the switch chip is no longer needed. The VDSMS network interface is replaced by multiple network interfaces, each of which can connect to the network devices directly. That naturally makes VDSMS the confluence of all network traffic.

In yet another embodiment of the invention, the VDSMS is integrated with the data storage server. The VDSMS is a heavy user of data storage itself because it keeps track of a large amount data for enforcing network security. An integrated data storage server offers high speed of access.

In yet another embodiment of the invention, the VDSMS is attached to the data storage server directly. Said embodiment of the invention completely separates the data storage server from other devices on the LAN physically. That assures that the VDSMS has complete authority in implementing its data access security policy. Using the example in FIG. 2, the embodiment corresponds to using connection 4 and not using connection 3.

Figure 5:
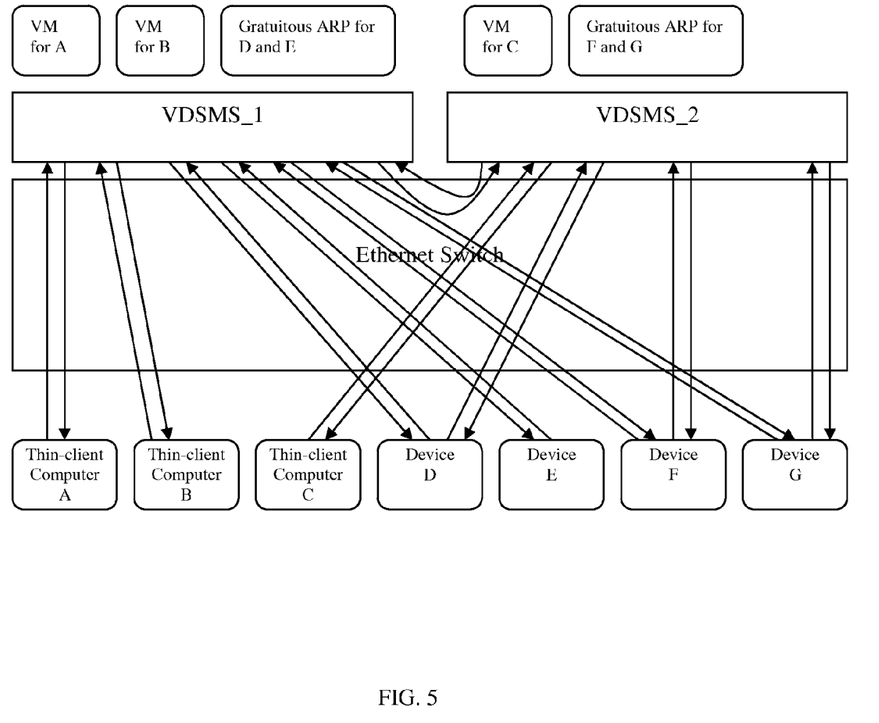
FIG. 5 illustrates the traffic pattern of a network comprising two members of a VDSMS group.

In yet another embodiment of the invention, VDSMS is actually a group of interconnected VDSMS via the LAN switch performing the same functionality for scalability reason. Each VDSMS takes part of the load. For example, the virtual desktop client connections are distributed among members of the VDSMS group. Also, each member of the VDSMS group is a traffic confluence for a subset of network devices such that traffic destined to a specific network device tends to go through the same member of the VDSMS group. The load balancing algorithm can be based on a hash value on the MAC address of the regular computer or the virtual desktop client computer. FIG. 5 shows an example. The VMs for thin-client computers A and B are hosted on VDSMS_1, and the VM for thin-client computer C is hosted on VDSMS_2. Consequently, traffic to and fro A goes through VDSMS_1, traffic to and fro B goes through VDSMS_1, and traffic to and fro C goes through VDSMS_2. VDSMS_1 is responsible for Devices D and E. That means VDSMS_1 sends out gratuitous ARP packets such that packets destined to Devices D and E are drawn to VDSMS_1. Similarly, VDSMS_2 is responsible for Devices F and G. However, for efficiency, VDSMS_1 is still able to send to Devices F and G, and VDSMS is also able to send to Devices D and E. In other words, VDSMS_1 and VDSMS_2 have the real ARP table for all devices on the LAN, but VDSMS_1 and VDSMS_2 are responsible for different devices when it comes to sending gratuitous ARP packets and intercepting traffic.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A system to provide virtual desktop and security management service on a local area network (LAN) on which a plurality of virtual machines and a plurality of regular computing devices are interconnected, the system comprising:
   one or more network interfaces for sending packets to and receiving packets from the plurality of regular computing devices on the LAN;
   a Media Access Control (MAC) address;
   a hypervisor over which the plurality of virtual machines are run, the hypervisor comprising a Real Address Resolution Protocol (ARP) Table and a Permitted Flows Database, the Real ARP Table to store mappings between MAC addresses and corresponding Internet Protocol (IP) addresses of the plurality of regular computing devices and the plurality of virtual machines on the LAN, the Permitted Flows Database to store flow entries having packets forwarded according to the Real ARP Table; and
   a Deep Packet Inspection (DPI) module, the DPI module to inspect packets received from the hypervisor for enforcing security policies, to install the flow entries in the Permitted Flows Database when future packets corresponding to the flow entries, of the packets received from the hypervisor, require no further inspection at the DPI module for enforcing the security policies, and to forward the packets received from the hypervisor that are permitted by the security policies back to the hypervisor;

wherein the hypervisor performs functions comprising:
intercepting packets sent by the plurality of regular computing devices on the LAN and by the plurality of virtual machines running over the hypervisor;
forwarding intercepted packets that do not correspond to any of the flow entries in the Permitted Flows Database to the DPI module; and
forwarding intercepted packets that correspond to the flow entries in the Permitted Flows Database to intended ones of the plurality of regular computing devices on the LAN and the plurality of virtual machines running over the hypervisor according to the Real ARP Table;

wherein the hypervisor intercepting packets sent by the plurality of regular computing devices on the LAN comprises:
sending out gratuitous ARP packets, using the MAC address, to the plurality of regular computing devices to enable the hypervisor to intercept all packets from the plurality of regular computing devices; and
storing MAC addresses and corresponding IP addresses of the intercepted packets of the plurality of regular computing devices and the plurality of virtual machines in the Real ARP Table.

2. The system of claim 1, wherein the hypervisor forwarding intercepted packets that correspond to the flow entries in the Permitted Flows Database to intended ones of the plurality of regular computing devices on the LAN and the plurality of virtual machines running over the hypervisor according to the Real ARP Table comprises:
for a packet having a destination MAC address equal to the MAC address of the system and having a destination IP address not equal to an IP address of any of the plurality of virtual machines, replacing the destination MAC address in the packet by the MAC address corresponding to the destination IP address according to the Real ARP Table and sending the packet out;
for a packet having a destination IP address equal to an IP address of one of the plurality of virtual machines, forwarding the packet to the one of the plurality of virtual machines; and
for a broadcast packet or a packet having a destination MAC address not equal to the MAC address of the system, forwarding the packet to the plurality of virtual machines.

3. The system of claim 1, wherein the hypervisor further performs Dynamic Host Configuration Protocol (DHCP) relay with steps comprising:
discovering an IP address of a DHCP server via DHCP;
relaying a DHCP discovery or request from any one of the plurality of regular computing devices or the plurality of virtual machines on the LAN to the DHCP server; and
relaying a DHCP offer or acknowledgment packet received from the DHCP server to the one of the plurality of regular computing devices or the plurality of virtual machines that has sent the DHCP discovery or request.

4. The system of claim 1, wherein the functions further comprising enabling a plurality of interconnected instances of the system to behave as a single instance of the system by having each of the plurality of interconnected instances hosting a non-overlapping subset of the plurality of virtual machines and sending out gratuitous ARP packets to a non-overlapping subset of the plurality of regular computing devices.

5. A method for providing integrated virtual desktop and security management service at a virtual desktop server on a local area network (LAN) on which a plurality of virtual machines, hosted on the virtual desktop server, and a plurality of regular computing devices are interconnected, the virtual desktop server comprising a hypervisor, a Deep Packet Inspection (DPI) module, a Real Address Resolution Protocol (ARP) Table, a Permitted Flows Database, and a Media Access Protocol (MAC) address, the method comprising:
sending out, by the hypervisor, gratuitous ARP packets, using the MAC address, to the plurality of regular computing devices to enable the hypervisor to intercept all packets from the plurality of regular computing devices;
storing, by the hypervisor, mappings between MAC addresses and corresponding Internet Protocol (IP) addresses of intercepted packets of the plurality of regular computing devices and the plurality of virtual machines in the Real ARP Table, wherein the plurality of regular computing devices and the plurality of virtual machines are interconnected on the LAN;
inspecting, by the DPI module, packets received from the hypervisor for enforcing security policies;
installing, by the DPI module, flow entries in the Permitted Flows Database, wherein the Permitted Flows Database stores the flow entries having packets forward according to the Real ARP Table, when the DPI module determines that there is no further need to forward intercepted packets corresponding to the flow entries to the DPI module for enforcing security policies at the DPI module;
forwarding, by the DPI module, the packets received from the hypervisor that are permitted by the security policies back to the hypervisor;
intercepting, by the hypervisor, packets sent by the plurality of regular computing devices on the LAN and by the plurality of virtual machines running over the hypervisor;
forwarding, by the hypervisor, intercepted packets that do not correspond to any of the flow entries in the Permitted Flows Database to the DPI module for enforcing security policies at the DPI module; and
forwarding, by the hypervisor, intercepted packets that correspond to the flow entries in the Permitted Flows Database to intended ones of the plurality of regular computing devices and the plurality of virtual machines according to the Real ARP Table.

6. The method of claim 5, further comprising:
discovering, by the hypervisor, an IP address of a DHCP (Dynamic Host Configuration Protocol) server via DHCP;
relaying, by the hypervisor, a DHCP discovery or request from any one of the plurality of regular computing devices or the plurality of virtual machines on the LAN to the DHCP server; and
relaying, by the hypervisor, a DHCP offer or acknowledgment packet received from the DHCP server to the one of the plurality of regular computing devices or the plurality of virtual machines that has sent the DHCP discovery or request.

7. The method of claim 5, wherein forwarding, by the hypervisor, intercepted packets that correspond to the flow entries in the Permitted Flows Database to intended ones of the plurality of regular computing devices and the plurality of virtual machines according to the real ARP Table comprises:

for a packet having a destination MAC address equal to the MAC address of the virtual desktop server and having a destination IP address not equal to an IP address of any of the plurality of virtual machines, replacing the destination MAC address in the packet by the MAC address corresponding to the destination IP address according to the Real ARP Table and sending the packet out;

for a packet having a destination IP address equal to an IP address of one of the plurality of virtual machines, forwarding the packet to the one of the plurality of virtual machines; and for a broadcast packet or a packet having a destination MAC address not equal to the MAC address of the virtual desktop server, forwarding the packet to the plurality of virtual machines.

* * * * *